(12) United States Patent
Cipriano et al.

(10) Patent No.: US 12,290,871 B2
(45) Date of Patent: May 6, 2025

(54) METHOD AND SYSTEM FOR JOINING WORKPIECES

(71) Applicant: GM GLOBAL TECHNOLOGY OPERATIONS LLC, Detroit, MI (US)

(72) Inventors: Steven Cipriano, Chesterfield Township, MI (US); Pei-chung Wang, Forest Hills, NY (US); Zhenke Teng, Troy, MI (US); Anthony V. Minatel, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 77 days.

(21) Appl. No.: 17/987,913

(22) Filed: Nov. 16, 2022

(65) Prior Publication Data

US 2024/0157463 A1    May 16, 2024

(51) Int. Cl.
| | | |
|---|---|---|
| *B23K 11/20* | (2006.01) | |
| *B23K 11/11* | (2006.01) | |
| *B23K 35/36* | (2006.01) | |
| *B23K 37/00* | (2025.01) | |
| *B23K 103/04* | (2006.01) | |
| *B23K 103/10* | (2006.01) | |

(52) U.S. Cl.
CPC ............ *B23K 11/20* (2013.01); *B23K 11/115* (2013.01); *B23K 35/3613* (2013.01); *B23K 37/00* (2013.01); *B23K 2103/04* (2018.08); *B23K 2103/10* (2018.08)

(58) Field of Classification Search
None
See application file for complete search history.

(56) References Cited

U.S. PATENT DOCUMENTS

| | | | | |
|---|---|---|---|---|
| 7,399,942 B2* | 7/2008 | Wang | ................... | B23K 1/0004 |
| | | | | 219/92 |
| 7,429,713 B2* | 9/2008 | Wang | ................... | B23K 11/004 |
| | | | | 219/86.9 |
| 8,987,630 B2* | 3/2015 | Hengel | ................... | B23K 11/06 |
| | | | | 219/84 |
| 11,383,319 B2 | 7/2022 | Wang | | |

FOREIGN PATENT DOCUMENTS

| | | |
|---|---|---|
| EP | 3670564 A1 | 9/2021 |
| EP | 102022124345 A1 | 7/2023 |

OTHER PUBLICATIONS

CN 106583899A machine translation (Year: 2017).*

* cited by examiner

*Primary Examiner* — Barbara J Musser
(74) *Attorney, Agent, or Firm* — Quinn IP Law

(57) ABSTRACT

Methods and systems for joining multiple workpieces are provided. In one example, the method includes dispensing adhesive on a first workpiece. A second workpiece is contacted with the adhesive such that the adhesive is disposed between the first and second workpieces. Resistance heating is produced in the first and second workpieces at first processing conditions to partially cure the adhesive and affix the first and second workpieces together to form a partially cured, adhesive-joined workpiece assembly. The partially cured, adhesive-joined workpiece assembly is exposed to heat at second processing conditions to substantially fully cure the adhesive.

5 Claims, 5 Drawing Sheets

METHOD AND SYSTEM FOR JOINING WORKPIECES

INTRODUCTION

The present disclosure relates generally to joining technologies, and more particularly, relates to methods and systems for joining multiple workpieces together using adhesive.

Spot welding has been a common and successful process for joining steel workpieces together. Spot welding has largely been successful because the materials being joined were the same or very similar to one another. In recent years, newer more advanced high-strength steels have been developed, which have many desirable properties. However, if the materials being joined are not the same or similar (e.g., high-strength steel workpiece being joined with either a mild-steel or aluminum alloy workpiece), spot welding the two materials together is more challenging. For example, when attempting to spot weld metal workpieces together where each of the metal workpieces is largely different from one another, the result has been a lack of weld penetration in at least one of the metal pieces. When each of the metal workpieces have resistivities that differ to a large extent, the weld penetration may be inadequate, and the weld joint may easily break apart.

One solution is to mechanically fasten the two dissimilar materials together, for example, using self-piercing rivets. However, when one of the workpieces is formed of an advanced high-strength steel, the use of self-piercing rivets to join the two workpieces is sometimes impractical because of the relatively high hardness of the high-strength steel and the difficulty for the rivet(s) to penetrate into the much harder, high-strength steel workpiece.

SUMMARY

A method for joining multiple workpieces is provided. The method includes dispensing adhesive on a first workpiece. The method further includes contacting a second workpiece with the adhesive such that the adhesive is disposed between the first and second workpieces. The method further includes producing resistance heating in the first and second workpieces at first processing conditions to partially cure the adhesive and affix the first and second workpieces together to form a partially cured, adhesive-joined workpiece assembly. The method further includes exposing the partially cured, adhesive-joined workpiece assembly to heat at second processing conditions to substantially fully cure the adhesive.

In some embodiments, the first and second workpieces each includes metal.

In some embodiments, the first workpiece includes one of a steel alloy and an aluminum alloy, and the second workpiece includes the other one of the steel alloy and the aluminum alloy.

In some embodiments, dispensing includes dispensing the adhesive selected from one of a polyurethane adhesive system, an epoxy adhesive system, and an acrylic adhesive system.

In some embodiments, prior to producing resistance, the method further includes contacting the first workpiece with a first electrode heating and contacting the second workpiece with a second electrode.

In some embodiments, producing resistance heating includes producing resistance heating in the first and second workpieces at the first processing conditions that include producing an electrical current between the first and second electrodes of from about 1.5 kiloamps (kA) to about 2.5 kA.

In some embodiments, producing resistance heating includes producing resistance heating in the first and second workpieces at the first processing conditions that include producing an electrical current between the first and second electrodes for about 1.5 seconds to about 2.5 seconds.

In some embodiments, producing resistance heating includes producing resistance heating in the first and second workpieces at the first processing conditions that include producing an electrical current between the first and second electrodes for a time and at a current effective to produce a temperature in the first and second workpieces of from about 200° C. to about 375° C.

In some embodiments, producing resistance heating includes producing resistance heating in the first and second workpieces at the first processing conditions that include the first and second electrodes applying a force of from about 3 kilonewtons (kN) to about 5 kN to the first and second workpieces.

In some embodiments, producing resistance heating includes producing resistance heating in the first and second workpieces at the first processing conditions that include the first and second electrodes applying a force to the first and second workpieces to squeeze the adhesive between the first and second workpieces to a thickness of from about 100 micrometers (μm) to about 4000 μm.

In some embodiments, exposing includes exposing the partially cured, adhesive-joined workpiece assembly to heat at the second processing conditions that include a temperature of from about 150° C. to about 200° C. and for a time of from about 15 minutes to about 25 minutes.

According to an alternative embodiment, a method for joining multiple workpieces is provided. The method includes dispensing adhesive on a first workpiece. A second workpiece is contacted with the adhesive such that the adhesive is disposed between the first and second workpieces. Resistance heating is produced in the first and second workpieces at first processing conditions to partially cure the adhesive and affix the first and second workpieces together to form a partially cured, adhesive-joined workpiece assembly. The first processing conditions include producing an electrical current between the first and second electrodes for a time and at a current effective to produce a first temperature in the first work piece and a second temperature in the second workpieces that is different than the first temperature. The partially cured, adhesive-joined workpiece assembly is exposed to heat at second processing conditions to substantially fully cure the adhesive.

According to an alternative embodiment, a system for joining multiple workpieces is provided. The system includes a dispenser operable to dispense adhesive on a first workpiece. The system further includes a fixture operable to support the first workpiece while a second workpiece is contacted with the adhesive such that the adhesive is disposed between the first and second workpieces. The system further includes a first electrode that is operable to contact the first workpiece. The system further includes a second electrode that is operable to contact the second workpiece. The first and second electrodes are cooperatively operable to produce resistance heating in the first and second workpieces at first processing conditions to partially cure the adhesive and affix the first and second workpieces together to form a partially cured, adhesive-joined workpiece assembly. The system further includes a heating arrangement operable to generate heat that is exposed to the partially cured, adhesive-joined workpiece assembly at second processing conditions to substantially fully cure the adhesive.

In some embodiments, the first electrode and the second electrode each have a corresponding longitudinal axis. The first and second electrodes each include a corresponding electrode face that interfaces with a corresponding one of the first and second workpieces. The corresponding electrode face has a maximum face dimension transverse to the corresponding longitudinal axis of from about 8 millimeters (mm) to about 40 mm. The first and second electrodes each further include a corresponding electrode body that supports the corresponding electrode face. The corresponding electrode body has a maximum body dimension transverse to the corresponding longitudinal axis of from about 8 mm to about 13 mm.

In some embodiments, the first electrode and the second electrode each include a corresponding electrode face that interfaces with a corresponding one of the first and second workpieces. The corresponding electrode face has a shape selected from one of a circular shape, an oval shape, a polygonal shape, a curved shape, and combinations thereof.

In some embodiments, the first and second electrodes are cooperatively operable to produce resistance heating in the first and second workpieces at the first processing conditions that include producing an electrical current between the first and second electrodes of from about 1.5 kA to about 2.5 kA.

In some embodiments, the first and second electrodes are cooperatively operable to produce resistance heating in the first and second workpieces at the first processing conditions that include producing an electrical current between the first and second electrodes for about 1.5 seconds to about 2.5 seconds.

In some embodiments, the first and second electrodes are cooperatively operable to produce resistance heating in the first and second workpieces at the first processing conditions that include producing an electrical current between the first and second electrodes for a time and at a current effective to produce a temperature in the first and second workpieces of from about 200° C. to about 375° C.

In some embodiments, the first and second electrodes are cooperatively operable to produce resistance heating in the first and second workpieces at the first processing conditions that include the first and second electrodes applying a force of from about 3 kN to about 5 kN to the first and second workpieces.

In some embodiments, the heating arrangement is a bake oven operable to generate heat at the second processing conditions that include a temperature of from about 150° C. to about 200° C. and for a time of from about 15 minutes to about 25 minutes.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 1 illustrates, in cross-sectional view, a first workpiece during an early joining manufacturing stage in accordance with one or more embodiments of the disclosure;

FIG. 2 illustrates, in cross-sectional view, a first and a second workpiece during a further advanced joining manufacturing stage in accordance with one or more embodiments of the disclosure;

FIG. 3 illustrates, in cross-sectional view, a first and a second workpiece during a further advanced joining manufacturing stage in accordance with one or more embodiments of the disclosure;

FIG. 4A is a graphical representation of nodal temperatures produced by resistance heating at various locations within a stack including the first and second workpieces during an intermediate joining manufacturing stage in accordance with one or more embodiments of the disclosure;

FIG. 4B illustrates, in cross-sectional view, the stack including the first and second workpieces corresponding with the graphical representation of nodal temperatures depicted in FIG. 4A in accordance with one or more embodiments of the disclosure;

FIG. 5 is a graphical representation of processing conditions applied to the stack during the intermediate joining manufacturing stage depicted in FIGS. 4A-4B in accordance with one or more embodiments of the disclosure;

FIG. 6 illustrates, in cross-sectional view, a first and a second workpiece during a further advanced joining manufacturing stage in accordance with one or more embodiments of the disclosure; and FIG. 7 is a flowchart of a method for joining multiple workpieces and a graphical representation of curing content percentage (%) of adhesive used to join the workpieces via the method in accordance with one or more embodiments of the disclosure.

DETAILED DESCRIPTION

Figure 1:
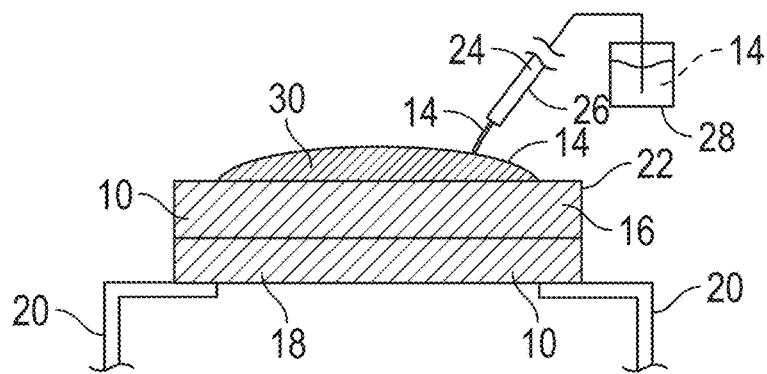
FIGS. 1-7 illustrate a method and a system for joining multiple workpieces in accordance with one or more embodiments of the disclosure.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Unless specifically stated from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, the numerical values provided herein are modified by the term "about."

The present disclosure relates to methods and systems for joining multiple workpieces. In accordance with one or more embodiments of the disclosure, adhesive is dispensed on a first workpiece, for example via a dispenser that is in fluid communication with an adhesive source. In some embodiments, the adhesive is a thermoset adhesive system that contains polymers, polymer precursors, and/or reactive components and is in the form of a liquid or paste that cross-links or otherwise cures, for example when exposed to elevated temperatures for an amount of time, to form a solid mass that affixes the adjacent surface(s) of the workpiece(s) that are in contact with the adhesive.

In accordance with one or more embodiments, the first workpiece is supported in a fixture either prior to and during dispensing of the adhesive onto the first workpiece or after dispensing of adhesive. A second workpiece contacts or is brought into contact with the adhesive such that the adhesive is disposed between and in contact with the first and second workpieces. In some embodiments, with the first workpiece supported by the fixture, the first and second workpieces are positionally registered and/or located relative to one another consistent with a predetermined geometry.

A first electrode contacts or is brought into contact with the first workpiece and a second electrode contacts or is brought into contact with the second workpiece. Electrical current supplied by the first and second electrodes travels through the first and second workpieces to produce resistance heating in the first and second workpieces at first processing conditions. As used herein, the phrase "resistance heating" is understood to mean that when electrical current passes through the conductive material (e.g., metal, electrically conductive composite material, or the like) heat is produced as a function of loss due to the resistivity of the conductive material. The heat generated from the resistance heating is conducted or otherwise transfers to the adjacent adhesive, partially curing the adhesive and affixing the first and second workpieces together to form a partially cured, adhesive-joined workpiece assembly. In some embodiments, the first and second workpieces are formed at least in part from metal, which may be similar or dissimilar metals having corresponding resistivities that are similar or dissimilar. Advantageously, in one or more embodiments of the disclosure, the areas of the first and second workpieces proximate to the first and second electrodes are rapidly heated, thereby causing the adjacent adhesive to start rapidly reacting and curing to a partially cured condition in a relatively short period of time. This sets the adhesive and affixes the first and second workpieces together sufficient to maintain the spatial relationship of the first and second workpieces relative to each other without necessarily requiring support from the fixture.

The partially cured, adhesive-joined workpiece assembly is removed from the fixture for subsequent downstream processing. Further in the downstream processing, the partially cured, adhesive-joined workpiece assembly is exposed to heat at second processing conditions to substantially fully cure the adhesive. In some embodiments, downstream processing includes a pretreatment process for electrocoat (E-coat) paint application and/or a decorative paint application to the workpiece assembly, either of which includes advancing the workpiece assembly in a bake oven that produces heat to cure the applied E-coat and/or decorative paint. Advantageously, in one or more embodiments of the present disclosure, exposing the partially cured, adhesive-joined workpiece assembly to heat that is produced as part of a downstream process(es) to cure the E-coat and/or decorative paint, also contemporaneously substantially fully cures the adhesive that joins the workpiece assembly together without requiring a separate heating stage or station to finish curing the adhesive and without negatively impacting the overall manufacturing cycle time.

Figure 7:
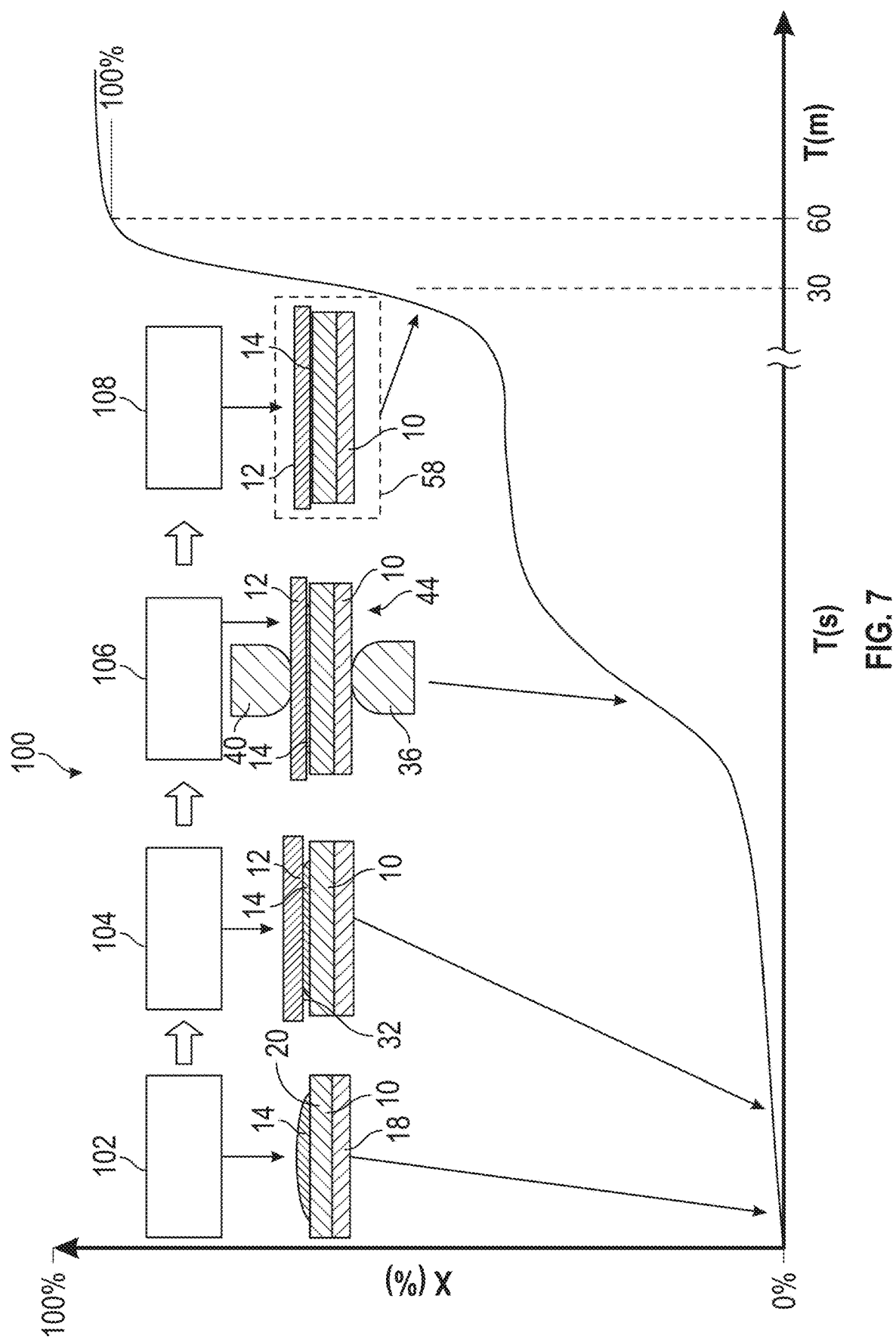

FIG. 1 illustrates, in cross-sectional view, a workpiece 10 during an early joining manufacturing stage in accordance with one or more embodiments of the disclosure. FIG. 7 is a flowchart of a method 100 for joining multiple workpieces 10 and 12 and a graphical representation of curing content percentage (%) of adhesive 14 used to join the workpieces 10 and 12 according to the method 100 in accordance with one or more embodiments of the disclosure.

The workpiece 10 may be formed of one or more workpiece sections 16 and 18 that have been joined together, for example, by welding, mechanical fastening, or the like. In some embodiments, the workpiece 10 includes two or more workpiece sections 16 and 18 that are formed from conductive materials, for example, metal that may be the same metal or different metals. In some examples, the workpieces sections 16 and 18 are formed of an advanced high-strength steel alloy(s) (e.g., workpiece section 18 is formed of a high-strength steel alloy, for example, dual phase (DP), ultra-high-strength 980 MPa grade steel alloy (DP980HDG), and workpiece section 16 is formed of a different high-strength steel alloy, for example, retained austenite (RA), ultra-high-strength 1180 MPa grade steel alloy (RA 1180) that are welded together). In some embodiments, the workpiece 10 is located and supported on a fixture 20.

The method 100 includes dispensing adhesive 14 (Box 102) from a dispenser 24 onto an outer surface 22 of the workpiece 10. The dispenser 24 includes a nozzle 26 that is in fluid communication with an adhesive source 28. The adhesive source 28 contains adhesive 14 that is in a liquid or paste form (e.g., uncured condition). As illustrated in FIG. 7, in some embodiments, the adhesive in the uncured condition has a cure content of from about 0% to about 15%, for example from about 0% to about 10%. With continuing reference to FIGS. 1 and 7, the adhesive 14 is advanced from the adhesive source 28, for example via a pump or the like, through the dispenser 24 and exits the nozzle 26 onto the outer surface 22 of the workpiece 10. In some embodiments, the adhesive 14 forms an adhesive bead 30 that is dispensed along a path on the outer surface 22 of the workpiece 10.

In one or more embodiments, the adhesive 14 is a thermoset adhesive system that contains polymers, polymer precursors, and/or reactive components and other additives and is in the form of a liquid or paste that cross-links or otherwise cures, for example as a function of temperature and time. Non-limiting examples of the adhesive 14 include one or two component adhesive systems, such as one or two component polyurethane adhesive systems, one or two component epoxy adhesive systems, one or two component acrylic adhesive systems, or the like. In one non-limiting example, the adhesive 14 is a one component toughened epoxy resin system that cures as a function of temperature and time, for example becoming substantially fully cured when exposed to a temperature of from about 150° C. about 200° C. for a time of from about 15 minutes to about 25 minutes, while having a shelf-life (e.g., remaining substantially uncured) of about 6 months at a storage temperature of from about 5° C. to about 25° C.

Figure 2:
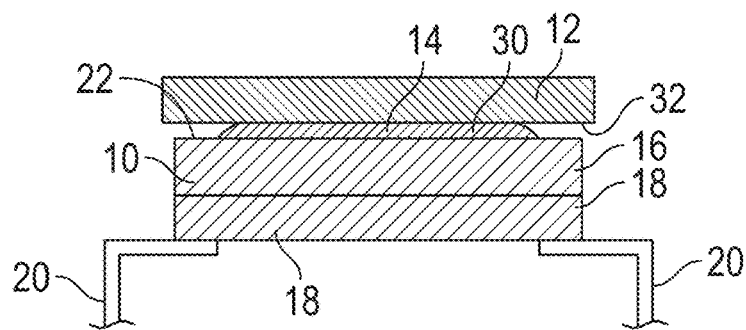

Referring to FIGS. 2 and 7, the method 100 continues by contacting the outer surface 32 of the workpiece 12 (Box 104) with the adhesive 14 (e.g., substantially uncured adhesive bead 30) such that the adhesive 14 is disposed between the workpieces 10 and 12. As illustrated, the fixture 20 supports the workpiece 10 while the workpiece 12 is contacted with the adhesive 14. In some embodiments, the fixture 20 and/or structures and/or features that are adjacent to the fixture 20, assist or facilitate locating the workpieces 10 and 12 relative to each other according to a predetermined geometry while the workpiece 12 is brought into contact with the adhesive 14.

In some embodiments, the workpiece 12 is formed of a single panel or workpiece section that is formed of metal while in other embodiments, the workpiece 12 is formed of two or more workpiece sections that are formed from metal, that may be the same metal or different metals. In some examples, the workpiece is formed of an aluminum alloy. A non-limiting example of an aluminum alloy (AA) is a 5000 series aluminum alloy, e.g., AA5182 or the like, having magnesium, manganese, and optionally other alloying elements as minor elements with a substantial portion of the remaining balance as aluminum.

Referring to FIGS. 3-5 and 7, the method 100 continues by contacting a surface 34 of the workpiece 10 with an electrode 36 and contacting a surface 38 the workpiece 12 with an electrode 40. As illustrated, the electrodes 36 and 40 are operably coupled to a power supply 42. Electrical current from the power supply 42 is cooperatively supplied through the electrodes 36 and 40 (e.g., anode and cathode respectively, or vice versa), and travels through the workpieces 10 and 12 to produce resistance heating (Box 106) in the workpieces 10 and 12 at processing conditions. The heat produced in the workpieces 10 and 12 rapidly transfers to the adjacent adhesive 14 to partially cure the adhesive 14 and affix the workpieces 10 and 12 together to form a partially cured, adhesive-joined workpiece assembly 44. As illustrated in FIG. 7, in some embodiments, the partially cured adhesive 14 has a cure content of from about 20% to about 75%, for example about 35% to about 70%.

Figure 5:
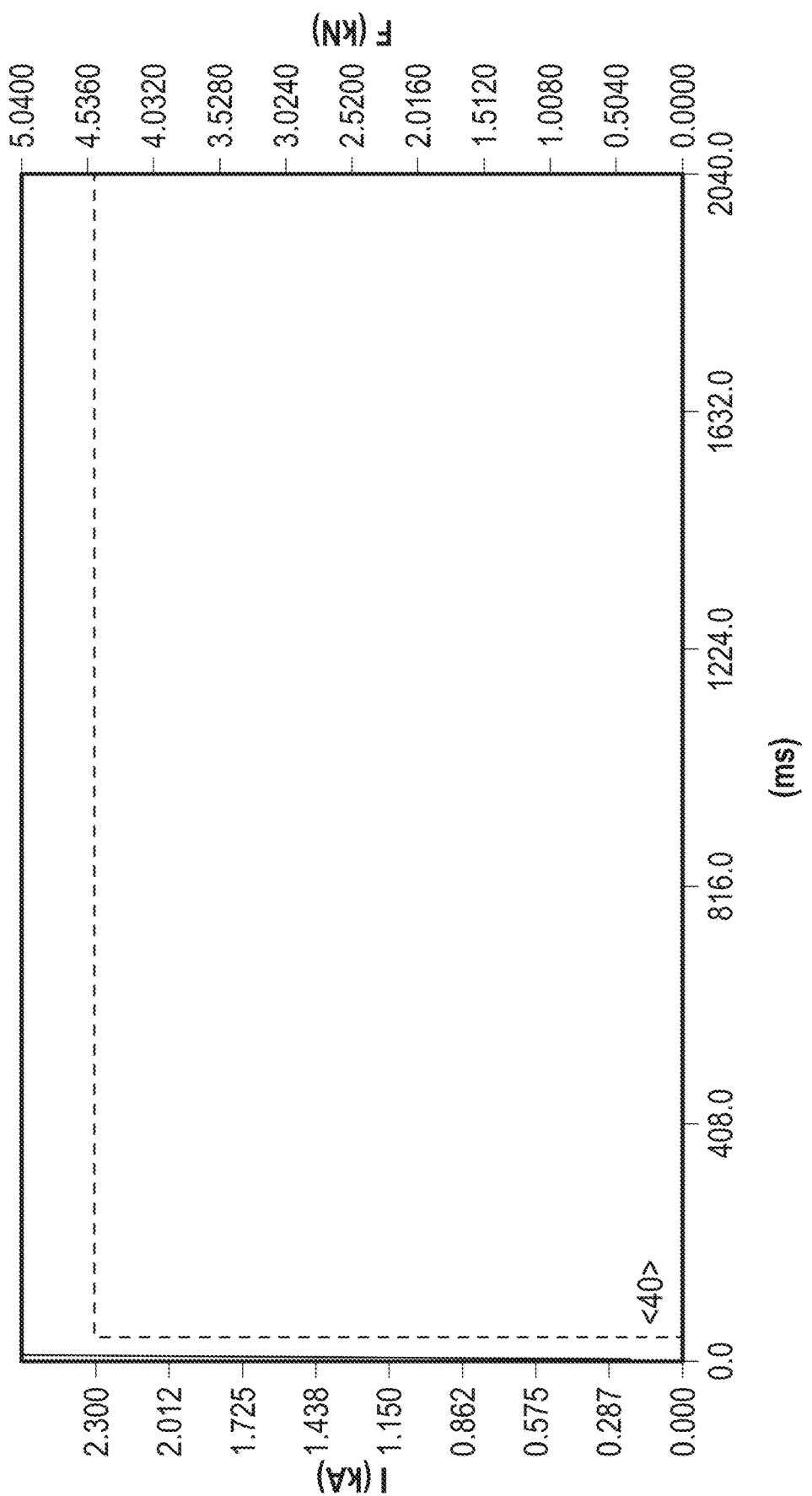

In one or more embodiments of the disclosure and as shown in FIGS. 4A-4B and 5, the processing conditions include producing an electrical current between the electrodes 36 and 40 of from about 1.5 kA to about 2.5 kA for a time of from about 1.5 seconds to about 2.5 seconds to produce temperatures in areas of the workpieces 10 and 12, which interface with or are adjacent to the adhesive 14, of from about 200° C. to about 375° C. In some embodiments, the temperatures produced in the workpieces 10 and 12 may be substantially the same, or different. For example, a steel-based workpiece 10 may reach a higher temperature (e.g., 250° C. to about 375° C.) than an aluminum-based workpiece 12 (e.g., 200° C. to about 275° C.) from resistance heating at the processing conditions. In some embodiments, the processing conditions include the electrodes 36 and 40 applying a force of from about 3 kN to about 5 kN to the workpieces 10 and 12 to squeeze the adhesive bead 30 while still in a liquid or paste form (e.g., before setting or partially curing of the adhesive 14) between the workpieces to a relatively thin bond thickness of from about 100 μm to about 4000 μm.

Figure 3:
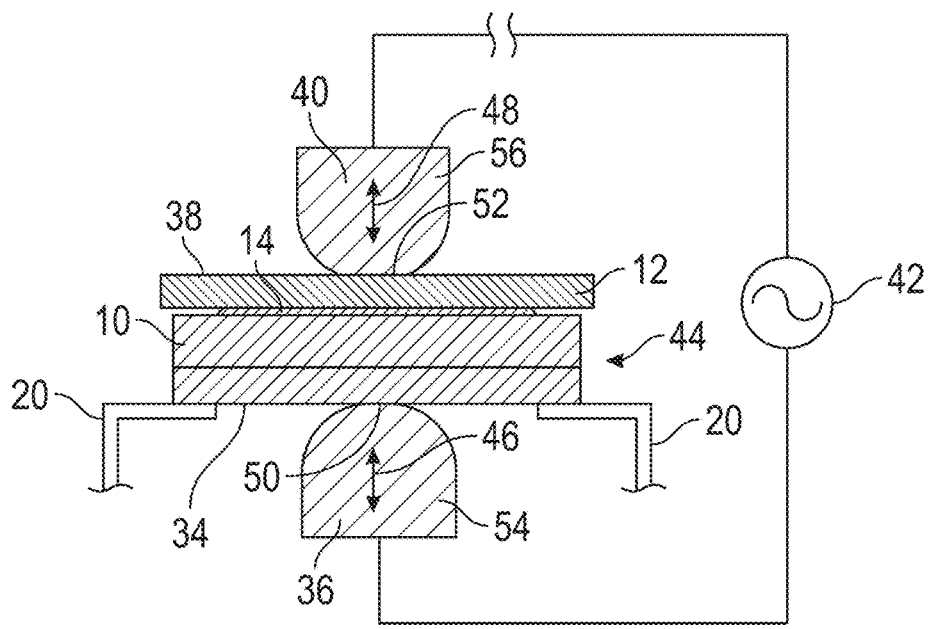
Figure 4:
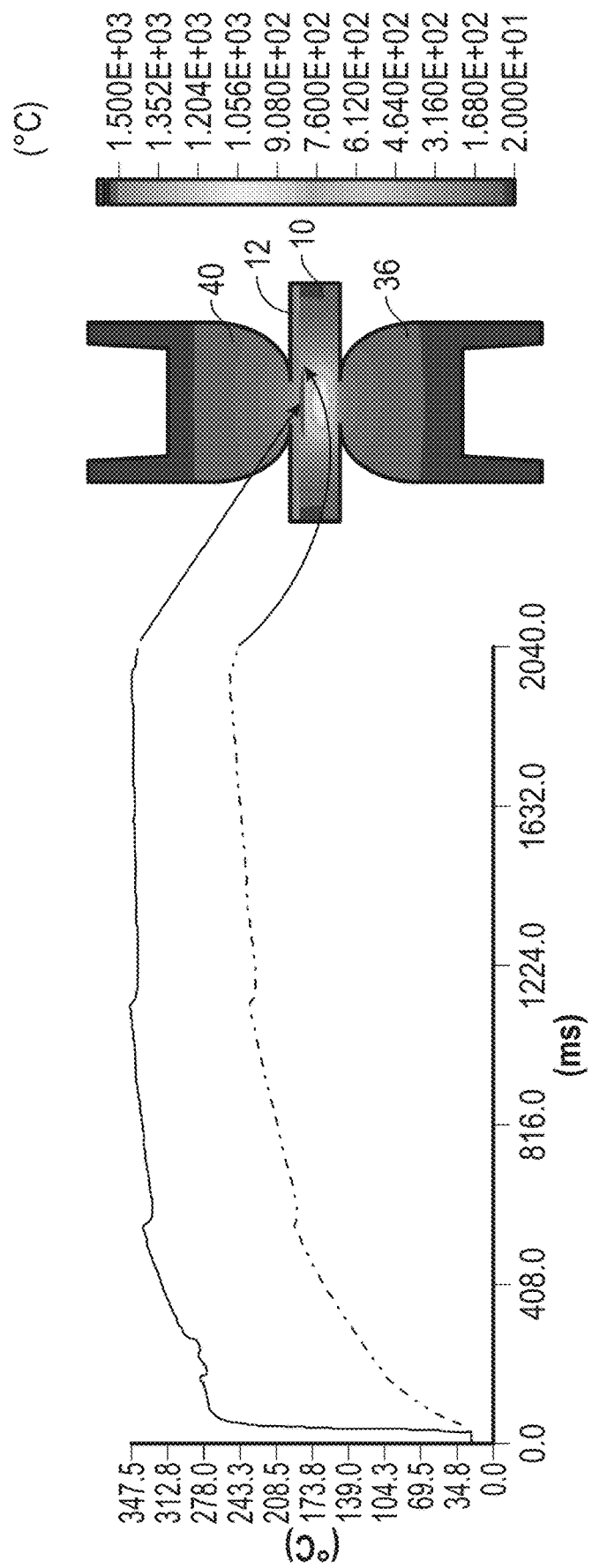

As illustrated in FIG. 3, the electrodes 36 and 40 each have a corresponding longitudinal axis (indicated by double headed arrows 46 and 48), a corresponding electrode face 50, 52 that interfaces with the corresponding workpieces 10, 12, and a corresponding electrode body 54, 56 that supports the corresponding electrode face 50, 52. In some embodiments, the corresponding electrode face 50, 52 has a maximum face dimension transverse to the corresponding longitudinal axis 46, 48 of from about 8 millimeters (mm) to about 40 mm. In some embodiments, the corresponding electrode body 54, 56 has a maximum body dimension transverse to the corresponding longitudinal axis 46, 48 of from about 8 mm to about 13 mm. In some embodiments, the corresponding electrode face 50, 52 has a shape that is a circular shape, an oval shape, a polygonal shape, a curved shape, or combinations thereof. Advantageously, having a relatively large corresponding electrode face 50, 52 with a relatively small corresponding electrode body 54, 56 enhances rapid heating of the metal areas of the workpieces 10, 12 adjacent to the adhesive 14 to expedite rapid partial curing of the adhesive 14 within a relatively short cycle time.

Figure 6:
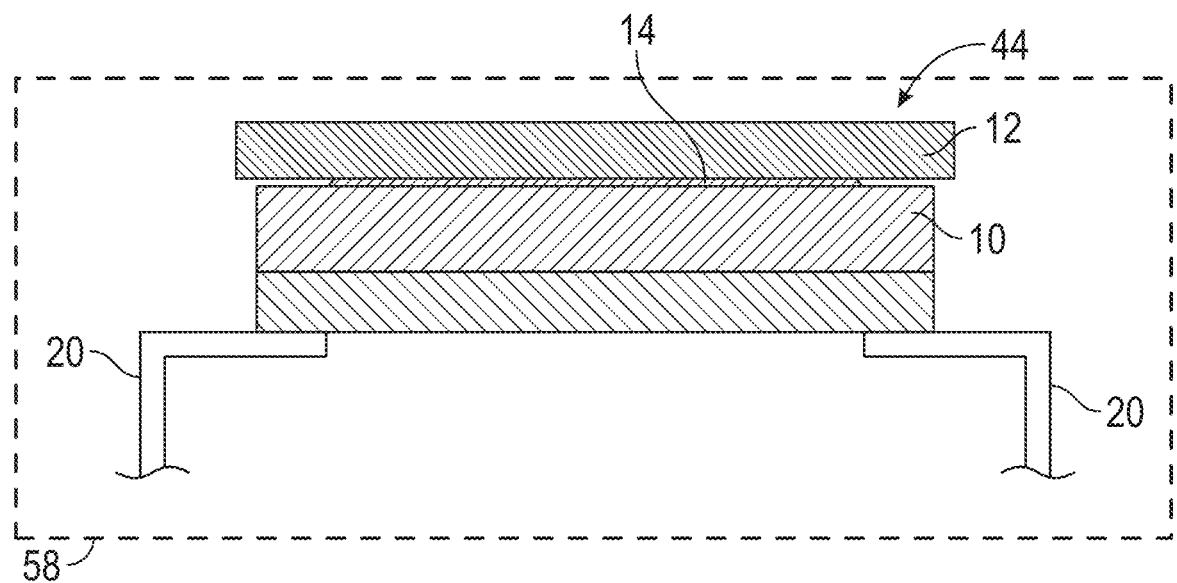

Referring to FIGS. 6-7, the method 100 continues by removing the partially cured, adhesive-joined workpiece assembly 44 from the fixture 20 and advancing the partially cured, adhesive-joined workpiece assembly 44 downstream for further processing. In one or more embodiments of the disclosure, further downstream processing includes exposing the partially cured, adhesive-joined workpiece assembly 44 (Box 108) to heat at processing conditions to substantially fully cure the adhesive 14. In some embodiments, the processing conditions include advancing the partially cured, adhesive-joined workpiece assembly 44 to a bake oven 58 that is operating to produce an internal oven temperature of from about 150° C. to about 200° C. In some embodiments, the partially cured, adhesive-joined workpiece assembly 44 is exposed to the internal oven temperature for a time of from about 15 minutes to about 25 minutes. As illustrated in FIG. 7, in some embodiments, the substantially fully cured adhesive 14 has a cure content of from about 85% to about 100%, such as about 90% to about 100%, for example about 95% to about 100%.

While the best modes for carrying out the disclosure have been described in detail, those familiar with the art to which this disclosure relates will recognize various alternative designs and embodiments for practicing the disclosure within the scope of the appended claims.

What is claimed is:

1. A method for joining multiple workpieces, the method comprising:
    dispensing adhesive on a first workpiece in an uncured condition in which the adhesive has a cure content of from 0% to 15%;
    contacting a second workpiece with the adhesive such that the adhesive is disposed between the first and second workpieces;
    contacting the first workpiece with a first electrode;
    contacting the second workpiece with a second electrode;
    after contacting the first workpiece with the first electrode and contacting the second workpiece with the second electrode, producing resistance heating in the first and second workpieces at first processing conditions to form a partially cured adhesive having a cure content of from 20% to 75% and affix the first and second workpieces together to form a partially cured, adhesive-joined workpiece assembly;
    wherein producing resistance heating includes producing an electrical current between the first and second electrodes of from 1.5 kA to 2.5 kA for 1.5 seconds to 2.5 seconds to produce a temperature in the first and second workpieces of from 200° C. to 375° C.;
    wherein producing resistance heating includes the first and second electrodes applying a force of from 3 kN to 5 kN to the first and second workpieces to squeeze the adhesive between the first and second workpieces to a thickness of from 100 μm to 4000 μm; and
    exposing the partially cured, adhesive-joined workpiece assembly to heat at second processing conditions that include a temperature of from 150° C. to 200° C. for a time of from 15 minutes to 25 minutes to form a substantially fully cured adhesive;
    wherein the substantially fully cured adhesive has a cure content of from 85% to 100%.

2. The method of claim 1, wherein the first and second workpieces comprise conductive material.

3. The method of claim 2, wherein the first workpiece comprises one of a steel alloy and an aluminum alloy, and the second workpiece comprises the other one of the steel alloy and the aluminum alloy.

4. The method of claim 1, wherein dispensing comprises dispensing the adhesive selected from one of a polyurethane adhesive system, an epoxy adhesive system, and an acrylic adhesive system.

5. A method for joining multiple workpieces, the method comprising:

dispensing adhesive on a first workpiece in an uncured condition in which the adhesive has a cure content of from 0% to 15%;

contacting a second workpiece with the adhesive such that the adhesive is disposed between the first and second workpieces;

contacting the first workpiece with a first electrode;

contacting the second workpiece with a second electrode;

after contacting the first workpiece with the first electrode and contacting the second workpiece with the second electrode, producing resistance heating in the first and second workpieces at first processing conditions to form a partially cured adhesive having a cure content of from 20% to 75% and affix the first and second workpieces together to form a partially cured, adhesive-joined workpiece assembly, wherein producing resistance heating includes producing an electrical current between the first and second electrodes of from 1.5 kA to 2.5 kA for 1.5 seconds to 2.5 seconds to produce a temperature in the first and second workpieces of from 200° C. to 375° C.;

wherein the first processing conditions include producing the electrical current between the first and second electrodes for a time and at a current effective to produce a first temperature in the first workpiece and a second temperature in the second workpiece that is different than the first temperature;

wherein producing resistance heating includes the first and second electrodes applying a force of from 3 kN to 5 kN to the first and second workpieces to squeeze the adhesive between the first and second workpieces to a thickness of from 100 µm to 4000 µm; and exposing the partially cured, adhesive-joined workpiece assembly to heat at second processing conditions that include a temperature of from 150° C. to 200° C. for a time of from 15 minutes to 25 minutes to form a substantially fully cured adhesive;

wherein the substantially fully cured adhesive has a cure content of from 85% to 100%.

* * * * *